United States Patent [19]

Rumpza et al.

[11] Patent Number: 5,189,586
[45] Date of Patent: Feb. 23, 1993

[54] LANCED SHUTTER TAB FOR DISK CARTRIDGES

[75] Inventors: Paul D. Rumpza, Roseville; James J. Wulfing, Stillwater, both of Minn.

[73] Assignee: Minnesota Mining and Manufacturing Company, St. Paul, Minn.

[21] Appl. No.: 658,547

[22] Filed: Feb. 21, 1991

[51] Int. Cl.$^5$ .............................................. G11B 23/03
[52] U.S. Cl. ..................................................... 360/133
[58] Field of Search .................. 360/133, 132; 242/199

[56] References Cited

U.S. PATENT DOCUMENTS 5,084,862  1/1992  Fujita ............................... 360/133 X Primary Examiner—A. J. Heinz
Attorney, Agent, or Firm—Gary L. Griswold; Walter N. Kirn; Charles D. Levine

[57] ABSTRACT

A disk cartridge including a rotatable disk, a cartridge case for housing the disk, and a U-shaped shutter slidably disposed on the front wall of the cartridge case is disclosed. The cartridge case includes upper and lower walls, and a head access opening formed in both walls between a central axis and the front wall to access the disk. The access opening is opened and closed by the shutter which is biased closed. An indented portion is formed on the walls for receiving the shutter. Two tabs are formed in one shutter arm portion and are received in a slot formed in the cartridge case.

16 Claims, 2 Drawing Sheets

LANCED SHUTTER TAB FOR DISK CARTRIDGES

TECHNICAL FIELD

The present invention relates to rigid disk cartridges. More particularly, the present invention relates to shutter tabs for magnetic or optical diskette cartridges.

BACKGROUND OF THE INVENTION

Rigid recording disk cartridges having a circular, floppy magnetic or optical disk rotatably mounted within the disk cartridge case are well known. The cartridge is mountable on a disk drive apparatus to rotate the recording disk and access the disk by a recording head for recording or reproducing information. The disk cartridge includes a rotatable magnetic or optical disk, a cartridge case for housing the disk having a central axis and a front wall, and a U-shaped shutter which slides on the front wall of the case.

Referring to FIGS. 1 and 2, a cartridge 10' includes generally rectangular upper and lower walls 12 which mate to form the outer dimensions of the cartridge case 14. A drive shaft opening is formed through a central portion of the lower wall 12 to receive a drive shaft to rotate the magnetic disk 16 within the cartridge case 14. A head access opening is formed in both the upper and lower walls 12 between the central axis and the front wall 20 to access the magnetic disk 16. The head access opening is opened and closed by the shutter 130 which slides between open and closed positions in a sliding surface 26 which is defined by parallel edges 28. A spring biases the shutter 130 in the closed position to cover and close the head access openings. When the cartridge 10' is inserted into the disk drive, the shutter 130 is moved to the open position by the disk drive to provide access to the disk 16.

The current shutter design for disk cartridges also includes two tabs 144 which engage and ride in an elongate slot 46 in one wall 12 of the cartridge 10' to secure and guide the shutter 130 on the cartridge case 14. This is shown in FIG. 1. This performs satisfactorily but still leaves room for improvement. The tabs 144 are formed with a punch press. During fabrication, the tabs 144 have a raised surface which scratches adjacent shutters 130 during shipping. In the packaged finished disk cartridge, this raised surface abrades the shutter printing. Additionally, there is a 5° to 10° angle between the shutter 130 and the front wall 20 of the cartridge 10'. This angle contributes to decreased shutter horizontal drop performance. Such shutter displacement frequently results from the cartridge 10' being dropped during handling. One edge 40 of the shutter 130 rides over the edge 28 to encompass the thicker portion of the case 14. This can prevent the shutter 130 from opening upon insertion into the disk drive or prevent the cartridge 10' from loading into the drive.

In a modification of this design, the tabs are formed on the opposite side of the punched hole to help prevent the shutter from failing during a horizontal shutter drop. However, this shutter suffers from the same disadvantages as the conventional punched shutters.

SUMMARY OF THE INVENTION

The present invention improves on the shutters of known 3.5 inch microfloppy disk cartridges by providing a superior shutter-cartridge case interface with a lanced shutter tab. The disk cartridge includes a rotatable magnetic disk, a cartridge case for housing the rotatable disk having generally rectangular upper and lower walls, a front wall and side walls. The upper and lower walls mate to form the outer dimensions of the cartridge case. A drive shaft opening is formed through a central portion of the lower wall and receives a drive shaft to rotate the magnetic disk within the cartridge case. A head access opening is formed in both the upper and lower walls adjacent the front wall for providing access to the disk. The arm portion of each U-shaped edge serves as a stop for the shutter when the shutter is in the closed position. A spring biases the shutter closed. The cartridge case includes an indented sliding surface bordered by two edges perpendicular to the front wall of the cartridge case.

A U-shaped shutter is slidable on the front wall of the cartridge case and slides over the indented sliding surface to open and close the head access opening. The shutter has first and second arms and a base portion interconnecting the first and second arms.

Two tabs are formed in one shutter arm and are received and ride in a slot formed in the cartridge case to secure and guide the shutter on the cartridge case. The tab is formed by lancing the shutter to move material out of the plane of the shutter without punching a hole in the vicinity of the shutter material to be moved. This forms the tab without adjacent openings thereby decreasing the ability of debris to enter the cartridge. The tab is disposed substantially at a 90° angle with the plane of the shutter arm to properly engage the slot.

At least one shutter arm includes parallel side edges and the tab holds the shutter squarely onto the front wall of the cartridge to maintain the shutter arm side edges parallel with the indented sliding surface edges. When the shutter is closed one side edge of the shutter arm contacts the respective indented sliding surface edge along the entire side edge of the shutter arm. This reduces horizontal shutter drop failure.

DETAILED DESCRIPTION OF PREFERRED EMBODIMENTS

Figure 1:
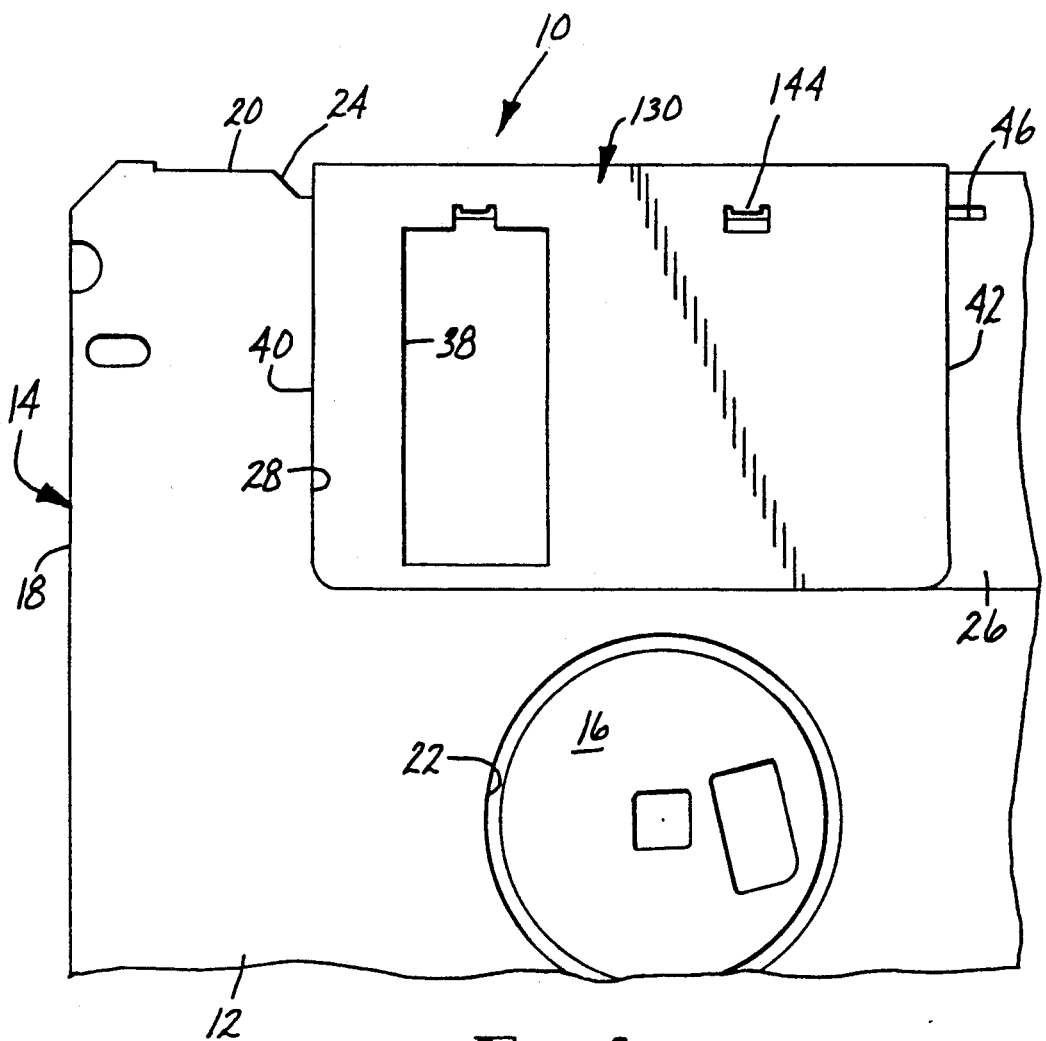
FIG. 1 is a plan view of a prior art disk cartridge.
Figure 2:
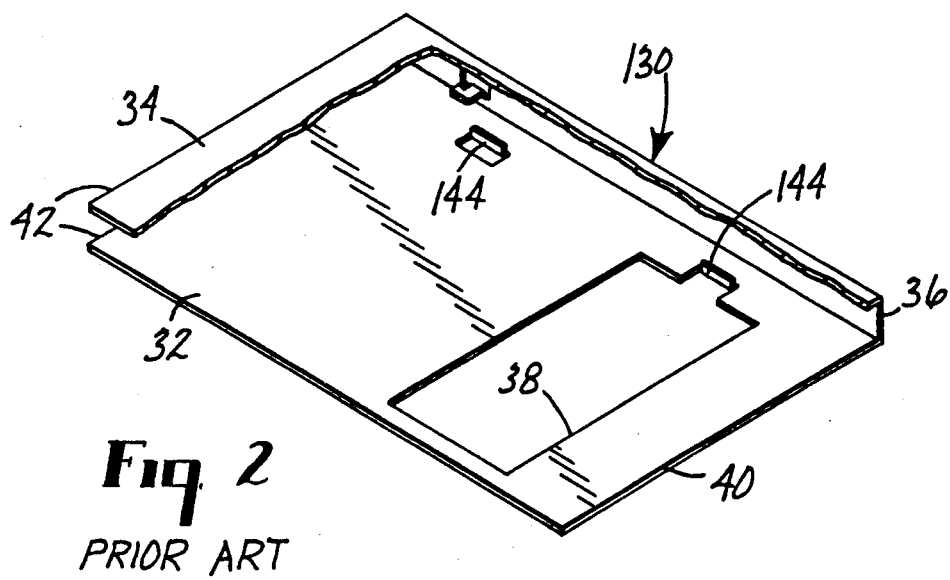
FIG. 2 is a perspective view of the shutter of the disk cartridge of FIG. 1, with portions cut away.

A 3½ inch rigid disk cartridge is illustrated in the figures and described below. Nonetheless, the present invention could also be adapted for and used with 5¼ inch disk cartridges, 2 inch disk cartridges, or other sized cartridges in which shutters are used. FIGS. 1 and 2 illustrate a prior art disk cartridge, and FIGS. 3 and 4 illustrate a disk cartridge with a shutter according to the present invention.

Figure 3:
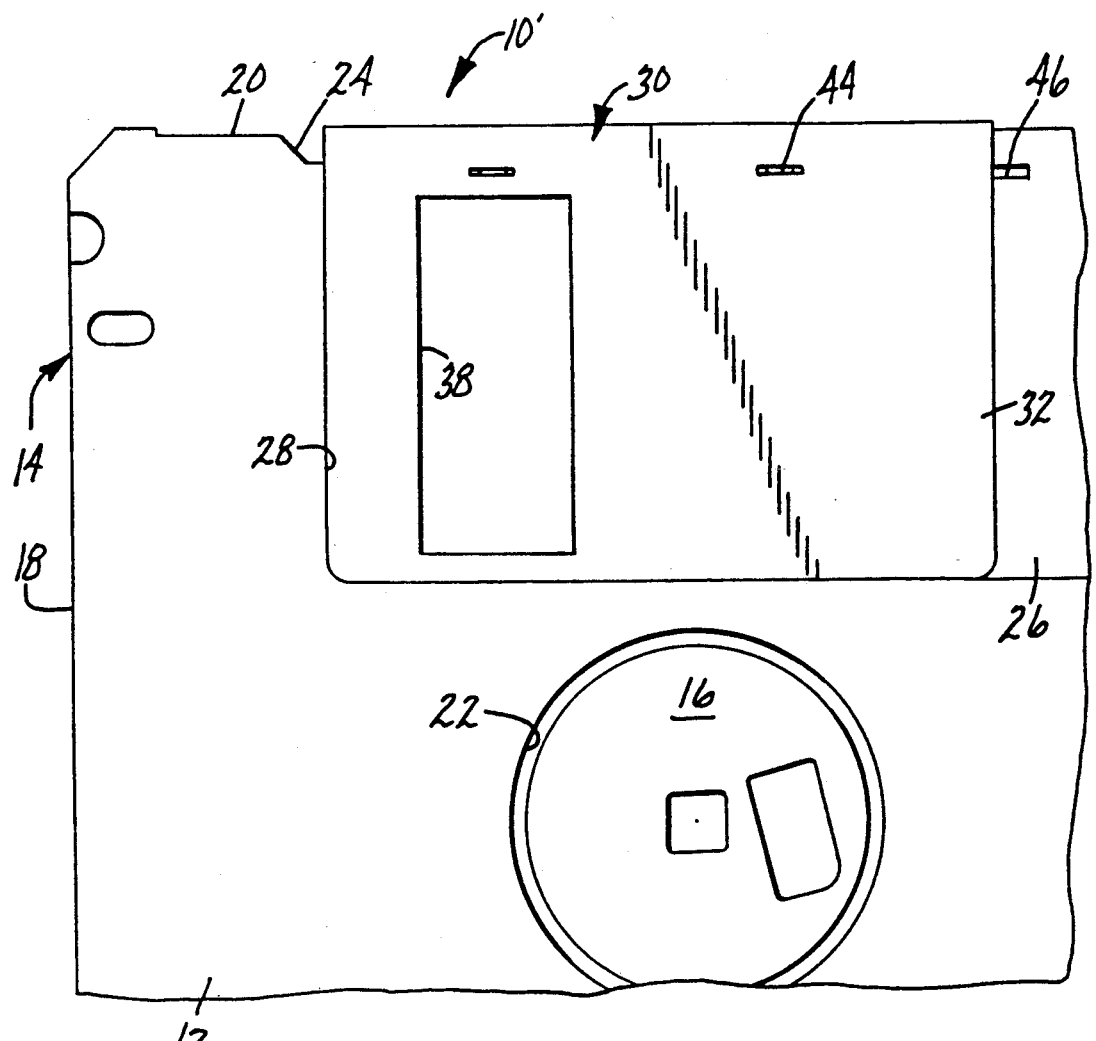
FIG. 3 is a plan view of a disk cartridge according to the present invention.
Figure 4:
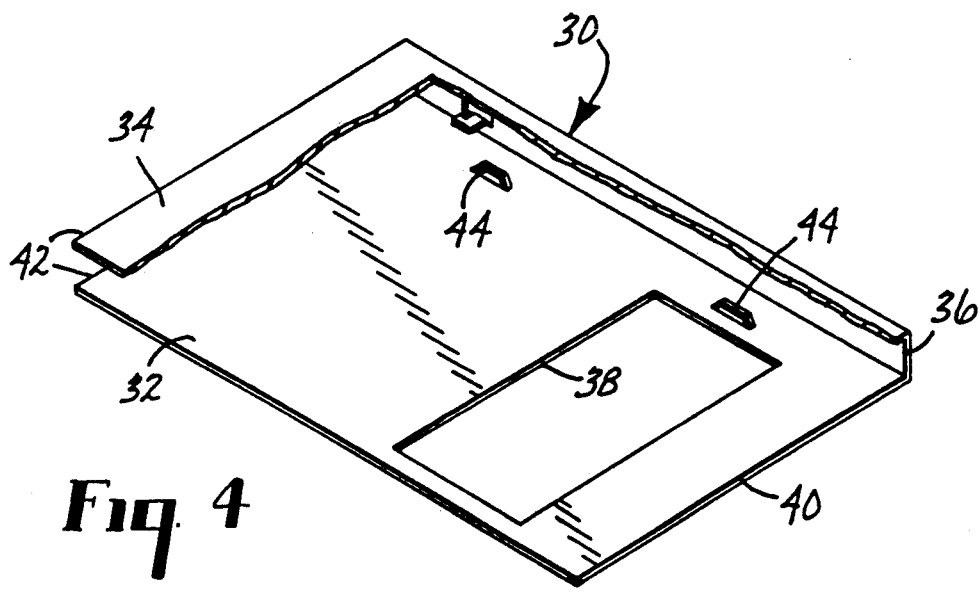
FIG. 4 is a perspective view of the shutter of the disk cartridge of FIG. 3, with portions cut away.

Referring to FIG. 3, the cartridge 10 includes upper and lower case walls 12 which are substantially identical in shape and mate to form a thin, substantially rectangular case 14. The case 14 is preferably formed of a rigid plastic material such as injection molded ABS resin, high impact polystyrene, or acetal. A circular floppy disk 16, formed of a magnetizable composition and having a circular metal central hub, is rotatably mounted within the case 14 between two circular nonwoven wipers (not shown). Each wiper contacts the disk surfaces to absorb shock, wipe debris from the disk 16, and permit the disk 16 to rotate without interference.

Peripheral edge walls extend perpendicularly from the upper and lower case walls 12 and form side walls 18 and a front wall 20 of the case 14, and an interior pocket for the disk 16. The lower case wall 12 has a central opening 22 aligned with a central axis of the disk 16 for receiving a drive shaft of a disk drive apparatus (not shown) to rotate the disk 16 within the case 14.

The upper and lower case walls 12 also have elongated, generally rectangular access openings (not shown) located between the central axis of the case 14 and the front wall 20. The access openings permit a read-write head (not shown) of the disk drive apparatus to access the disk 16. When the cartridge 10 is inserted into a disk drive, a shutter actuation pin (not shown) contacts the front wall 20 and slides a U-shaped shutter 30 to the right, as viewed in FIG. 3. A portion of the front wall 20 is recessed 24 to provide access for the shutter actuation pin. The cartridge case 14 also includes an indented sliding surface 26 on each of the upper and lower case walls 12. The sliding surface 26 is bordered by two edges 28 perpendicular to the front wall 20 of the cartridge case 14. The head access openings are formed within these sliding surfaces 26.

The U-shaped shutter 30 slides on the front wall 20 of the cartridge case 14 and over the sliding surfaces 26, to open and close the head access openings. The shutter 30 may be metal or plastic and includes an upper arm 32, a lower arm 34, and a base portion 36 which connects the upper and lower arms 32, 34. The upper and lower arms 32, 34 each have an opening 38 which registers with the access openings to permit access to the disk 16 by the read-write head when the shutter 30 is in the open position. Preferably both shutter arms 32, 34 include parallel side edges 40, 42, as shown in FIG. 4.

In the closed position, the left edge 40 of the shutter 30 is disposed against the left edge 28 of the sliding surface 26 as shown in FIG. 3. In the open position, the right edge 42 of the shutter 30 is disposed parallel to the right edge 28 of the sliding surface 26 with a gap of from 0.075 cm to 0.250 cm. The shutter 30 is biased in the closed position by a spring (not shown). When the shutter 30 moves from the open to the closed position, the left edge 40 of the shutter 30 is stopped by the left edge 28 of the sliding surface 26.

The shutter 30 also includes two tabs 44 which ride within a slot 46 on the sliding surface 26 in the upper case wall 12. The two tabs 44 are formed in the upper shutter arm 32 by lancing, a metal forming process in which a portion of metal is moved from a sheet without first punching a hole in the vicinity of the metal portion to be moved. The portion of material which forms the tabs 44 is connected at both longitudinal ends to the shutter 30. Shutters 30 having lanced tabs have better manufacturing and performance characteristics than known shutters 130 in which hole punching is required during formation. Additionally, the lanced shutter tab 44 is more visually appealing than punched shutter tabs 144.

The lanced shutter tabs 44 are formed without the large area holes that are required with punched tabs 144. The portion of the shutter 30 adjacent the shutter material moved to form the tabs 44 is unbroken. This reduces the chance of debris entering the cartridge 10 and thereby increases performance. Moreover, the prior art punched tabs 144 have a raised bulge created during the bending of the tabs, which can scratch adjacent shutters 130 during shipping. When the shutter 130 is installed on the cartridge case 14, the punched tab 144 configuration can scratch the plastic of the cartridge case 14, thereby creating debris which can enter the cartridge 10'. With the lanced tab design, the amount of debris is decreased. Also, in finished disk cartridges 10', the raised surface of the punched tabs 144 abrades the shutter printing. The lanced shutter tabs 44 neither scratch adjacent shutters during shipping nor abrade the shutter printing in finished disk cartridges 10.

Additionally, the prior art punched tabs 144 do not properly engage the slot 46 as the tabs are not at a 90° angle with the plane of the shutter 130. Although the punch press used to form the tab 144 bends it at a 90° angle, the tab springs back so that it is at an acute-- angle ranging from 80° to 87°. Nor can the punch press form the tab at an obtuse angle so that it springs back to 90°. The lanced shutter tab 44 can be precisely formed at a 90° angle (although a 87°-93° range is adequate) and properly engages the slot 46.

Furthermore, in prior art cartridges, there is an up to 5° angle between the shutter base portion 36 and the front wall 20 of the cartridge 10'. This angle is caused by the clearance between the tab 144 and the slot 46 which allows the torque from the shutter spring (not shown) to push the shutter 130 upwardly on the end connected to the spring. This is not visually desirable and contributes to decreased shutter horizontal drop performance. When the shutter is disposed at an angle, in the closed position the shutter contacts the edge 28 of the sliding surface 26 at a single point, rather than along the entire edge. Thus, there is less interface between the shutter 130 and the edge 40 and the shutter can ride over the edge to encompass the thicker portion of the case. This can prevent the shutter 130 from opening upon insertion into the disk drive or prevent the cartridge 10' from loading into the drive. In contradistinction, the lanced shutter tab 44 holds the shutter 30 squarely onto and substantially parallel with the front wall 20 of the cartridge 10 with reduced clearance to reduce shutter drop failure. When the shutter 30 is in the closed position, the edge 40 of the shutter arm 32 contacts the edge 28 of the sliding surface 26 along the entire length of the shutter arm edge 40.

Shutter drop, both vertical and horizontal, describes damage to the shutter 30 or disengagement of the shutter 30 from the case 14 when the cartridge 10 is dropped during handling. Vertical shutter drop occurs when the cartridge 10 is dropped directly on the shutter 30. Disengagement can be prevented and damage can be mitigated by decreasing the clearance between the shutter tabs and the sliding surface slot 46. Tests have shown that failure due to vertical shutter drop with known disk cartridges such as that of FIGS. 1 and 2 occurs at a drop height of approximately 23 cm. However, when the lanced shutter tab 44 is used, failure due to vertical shutter drop does not occur until drop heights of 76 cm.

Horizontal shutter drop occurs when the cartridge 10 is dropped parallel to the sliding direction of the shutter 30. Failure is embodied by the left edge 40 of the shutter 30 riding over the left edge 28 of the sliding surface 26 to encompass the thicker portion of the case 14 adjacent the sliding surface 26. This increases the force required to slide the shutter 30 along the cartridge 10, possibly to a level exceeding that which can be provided by the shutter actuation pin, thus preventing the shutter 30 from opening and the cartridge 10 from loading into the drive. This failure also can be prevented by decreasing the clearance between the case 14 and the shutter 30 as by using the lanced shutter tab 44. Tests have shown that failure due to horizontal shutter drop with known disk cartridges such as that of FIG. 1 occurs at a drop height of approximately 23 cm. However, when the lanced shutter tab 44 is used, failure due to horizontal shutter drop does not occur until drop heights of 107 cm.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, although magnetic disks have been described, the invention can be used with optical and other media disks as well.

We claim:

1. A tab for slidably securing a U-shaped shutter having a planar surface to the front wall of a substantially flat rigid disk cartridge case to open and close the head access opening, wherein the tab has two longitudinal ends and two lateral sides and is receivable in a slot formed in the cartridge case and comprises a portion of material out of the plane of the shutter, which is connected at both longitudinal ends to the shutter and is not connected at either lateral side to the shutter, and wherein the shutter has an edge adjacent the lateral side of the tab.

2. The tab of claim 1 wherein the angle formed between the plane of the shutter arm and a plane connecting the lateral side of the tab and the edge of the shutter adjacent the lateral side of the tab is between 89° and 91° to properly engage the slot.

3. The tab of claim 1 wherein the width of the tab is substantially equal to the perpendicular distance between the parallel walls adjacent the lateral sides of the tab.

4. A U-shaped shutter slidably disposed on the front wall of a substantially flat rigid disk cartridge case to open and close the head access opening comprising:
   first and second arms;
   a base portion connecting the first and second arms; and
   means for securing the shutter on the cartridge case comprising at least one tab formed in one shutter arm and receivable in a slot formed in the cartridge case, wherein the tab has two longitudinal ends and two lateral sides and comprises a portion of material out of the plane of the shutter which is connected at both longitudinal ends to the shutter and is not connected at either lateral side to the shutter, and wherein the shutter has an edge adjacent the lateral side of the tab.

5. The shutter of claim 4 wherein the securing means comprises two tabs.

6. The shutter of claim 4 wherein the angle formed between the plane of the shutter arm and a plane connecting the lateral side of the tab and the edge of the shutter adjacent the lateral side of the tab is between 89° and 91° to properly engage the slot.

7. The shutter of claim 4 wherein the cartridge case includes an indented sliding surface bordered by two edges perpendicular to the front wall of the cartridge case and the shutter slides over the indented sliding surface, wherein at least one shutter arm includes parallel side edges, the tab holds the shutter on the front wall of the cartridge to maintain the side edges of the shutter arm parallel with the indented sliding surface edges, and wherein when the shutter is closed one side edge of the shutter arm contacts the respective indented sliding surface edge along the entire side edge of the shutter arm.

8. The shutter of claim 7 wherein the tab holds the shutter on the front wall of the cartridge to maintain the base portion of the shutter parallel with the front wall.

9. The shutter of claim 2 wherein the width of the tab is substantially equal to the perpendicular distance between the parallel walls adjacent the lateral sides of the tab.

10. A substantially flat rigid disk cartridge comprising:
    a rotatable disk;
    a cartridge case for housing the rotatable disk comprising generally rectangular upper and lower walls, a front wall, and side walls; a drive shaft opening formed through one of the upper or lower walls to receive a drive shaft to rotate the disk within the cartridge case; and a head access opening formed in at least one of the upper and lower walls adjacent the front wall for providing access to the disk;
    a U-shaped shutter having a planar surface, first and second arms, and a base portion connecting the first and second arms, wherein the shutter is slidably disposed on the front wall of the cartridge case to open and close the head access opening;
    means for biasing the shutter in the closed position; and
    means for securing the shutter on the cartridge case comprising at least one tab formed in one shutter arm and a slot formed in the cartridge case for receiving the tab, wherein the tab has two longitudinal ends and two lateral sides and comprises a portion of material out of the plane of the shutter which is connected at both longitudinal ends to the shutter and is not connected at either lateral side to the shutter, and wherein the shutter has an edge adjacent the lateral side of the tab.

11. The cartridge of claim 10 wherein the securing means comprises two tabs.

12. The cartridge of claim 10 wherein the angle formed between the plane of the shutter arm and a plane connecting the lateral side of the tab and the edge of the shutter adjacent the lateral side of the tab is between 89° and 91° to properly engage the slot.

13. The cartridge of claim 10 wherein the cartridge case includes an indented sliding surface bordered by two edges perpendicular to the front wall of the cartridge case and the shutter slides over the indented sliding surface, wherein at least one shutter arm includes parallel side edges, the tab holds the shutter on the front wall of the cartridge to maintain the side edges of the shutter arm parallel with the indented sliding surface edges and to maintain the base portion of the shutter parallel with the front wall, and wherein when the shutter is closed one side edge of the shutter arm contacts the respective indented sliding surface edge along the entire side edge of the shutter arm.

14. The cartridge of claim 10 wherein the width of the tab is substantially equal to the perpendicular distance between the parallel walls adjacent the lateral sides of the tab.

15. A method of forming a U-shaped shutter for sliding on the front wall of a substantially flat rigid disk cartridge case to open and close the head access opening, the method comprising the steps of:

forming first and second arms connected by a base portion; and forming means for securing the shutter on the cartridge case by lancing at least one tab having two longitudinal ends and two lateral sides in one shutter arm to move material out of the plane of the shutter arm, the forming step comprising moving a portion of material out of the plane of the shutter by separating the portion of material at both lateral sides while maintaining the portion of material connected at both longitudinal ends to the shutter.

16. The method of claim 15 wherein the width of the portion of material forming the tab is substantially equal to the perpendicular distance between the parallel walls adjacent the lateral sides of the tab.

* * * * *